United States Patent
Oz

(10) Patent No.: US 8,752,816 B2
(45) Date of Patent: Jun. 17, 2014

(54) DYNAMIC BUFFER FOR INSERTER SYSTEM

(71) Applicant: Giora Oz, Negev (IL)

(72) Inventor: Giora Oz, Negev (IL)

(73) Assignee: Beeri Printers, Negev (IL)

( * ) Notice: Subject to any disclaimer, the term of this patent is extended or adjusted under 35 U.S.C. 154(b) by 0 days.

(21) Appl. No.: 13/658,013

(22) Filed: Oct. 23, 2012

(65) Prior Publication Data

US 2014/0109512 A1    Apr. 24, 2014

(51) Int. Cl.
| | |
|---|---|
| *B43M 3/00* | (2006.01) |
| *B43M 1/02* | (2006.01) |
| *B65G 15/26* | (2006.01) |
| *B65G 21/14* | (2006.01) |
| *B65H 29/66* | (2006.01) |

(52) U.S. Cl.
CPC ............... *B43M 1/02* (2013.01); *B65G 15/26* (2013.01); *B65G 21/14* (2013.01); *B65H 29/66* (2013.01)
USPC ....... 270/58.06; 270/58.3; 198/588; 198/594; 198/812

(58) Field of Classification Search
CPC ......... B43M 3/00; B65G 15/26; B65G 21/14; B65H 29/66
USPC ........... 270/32, 45, 52.17, 58.06, 58.07, 58.3, 270/58.29; 198/588, 589, 594, 812; 271/285
See application file for complete search history.

(56) References Cited

U.S. PATENT DOCUMENTS

| | | | | |
|---|---|---|---|---|
| 2,477,830 | A | * | 8/1949 | Sandberg ....................... 271/201 |
| 5,244,196 | A | * | 9/1993 | Walter et al. .................... 270/46 |
| 7,458,567 | B2 | * | 12/2008 | Yamada et al. ............. 270/58.07 |
| 7,530,447 | B2 | * | 5/2009 | Fritsche et al. ............... 198/644 |
| 7,591,454 | B2 | * | 9/2009 | Chapman et al. .......... 270/58.06 |

* cited by examiner

*Primary Examiner* — Leslie A Nicholson, III
(74) *Attorney, Agent, or Firm* — Dekel Patent Ltd.; David Klein

(57) ABSTRACT

An inserter system including a first station operative to output personal inserts for inserting in envelopes, an inserter operative to insert the personal inserts in the envelopes, and a dynamic buffer operative to convey the personal inserts from the first station to the inserter, the dynamic buffer including a partition-less adjustable length conveyor and an inserter-interface conveyor, wherein the adjustable length conveyor conveys the personal inserts from the first station to the inserter-interface conveyor and the inserter grabs the personal inserts from the inserter-interface conveyor, and wherein the inserter grabbing the personal inserts determines a speed of operation of the inserter-interface conveyor, including a timing at which the inserter-interface conveyor grabs the personal inserts from the adjustable length conveyor.

10 Claims, 3 Drawing Sheets

DYNAMIC BUFFER FOR INSERTER SYSTEM

FIELD OF THE INVENTION

The present invention relates generally to a buffer for use in an enveloping process, such as in a high speed mass mail processing and inserting system.

BACKGROUND OF THE INVENTION

Inserter systems are typically used to produce a large volume of specific mailings where the contents of each mail item are directed to a particular addressee, such as for banks, insurance companies, utility companies, municipalities and many more. In the type of inserter system relevant to the present invention, a personal insert is inserted in an envelope. A personal insert is a message intended for a particular addressee. The personal insert can be one or more sheets which come from a single source (e.g., continuous roll or fanfold paper or batches of sheets). The sheet or sheets are usually (but not necessarily) folded together and reach the inserter as one group for insertion into an envelope. Other mail items can be added afterwards in the enveloping process.

Inserter systems of this type work most efficiently when run at constant speed. However, the station (e.g., folder or cutter) that supplies the personal inserts cannot work at a constant speed due to the personal inserts having a different number of pages. As a result, the inserter system is forced to operate at varying speeds, which diminishes the efficiency of the system.

SUMMARY OF THE INVENTION

The present invention seeks to provide a novel dynamic buffer for use with an inserter system in an enveloping process, as is explained more in detail hereinbelow. With this dynamic buffer, the inserter system can operate at close to a constant speed, which improves the efficiency of the system.

In the prior art, there are buffer pockets or partitions along the buffer conveyor that separate the personal inserts from each other. In contrast, the dynamic buffer of the present invention employs a significantly simpler and less expensive system, wherein the personal inserts can overlap each other on the dynamic buffer conveyor, thereby eliminating the need for buffer pockets or partitions or step motors along the buffer conveyor.

In the prior art, the buffer conveyor feeds the inserter at a rate that is not just dependent on the inserter speed, but is also always dependent on the speed of the station (cutter or folder) that feeds the personal inserts to the buffer. In contrast, the dynamic buffer of the present invention feeds the inserter at a rate that is dependent only on the inserter speed, and up to a certain limit is independent of the speed of the station (cutter or folder or any kind of personal insert provider) that feeds the personal inserts to the buffer.

There is thus provided in accordance with a non-limiting embodiment of the invention an inserter system including a first station operative to output personal inserts for inserting in envelopes, an inserter operative to insert the personal inserts in the envelopes, and a dynamic buffer operative to convey the personal inserts from the first station to the inserter, the dynamic buffer including a partition-less adjustable length conveyor and an inserter-interface conveyor, wherein the adjustable length conveyor conveys the personal inserts from the first station to the inserter-interface conveyor and the inserter grabs the personal inserts from the inserter-interface conveyor, and wherein the inserter grabbing the personal inserts determines a speed of operation of the inserter-interface conveyor, including a timing at which the inserter-interface conveyor grabs the personal inserts from the adjustable length conveyor.

The personal inserts may overlap each other on the adjustable length conveyor. A controller may control operation of the dynamic buffer and the inserter.

In accordance with a non-limiting embodiment of the invention the inserter-interface conveyor includes a set of conveyor rollers that has at least one movable conveyor roller movable to different positions. The adjustable length conveyor may include at least one movable conveyor roller movable to various positions and the adjustable length conveyor has different lengths at the various positions. The inserter-interface conveyor may include a terminal roller adjacent the inserter and an intermediate roller between the at least one movable conveyor roller and the terminal roller, wherein the intermediate roller is movable such that an angle is changeable between the intermediate roller and the at least one movable conveyor roller or the terminal roller.

The length of the inserter-interface conveyor may be constant. The distance may be constant from the at least one movable conveyor roller to the terminal roller.

In accordance with a non-limiting embodiment of the invention a length of the adjustable length conveyor changes in accordance with a number of personal inserts that are on it.

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

Figure 1:
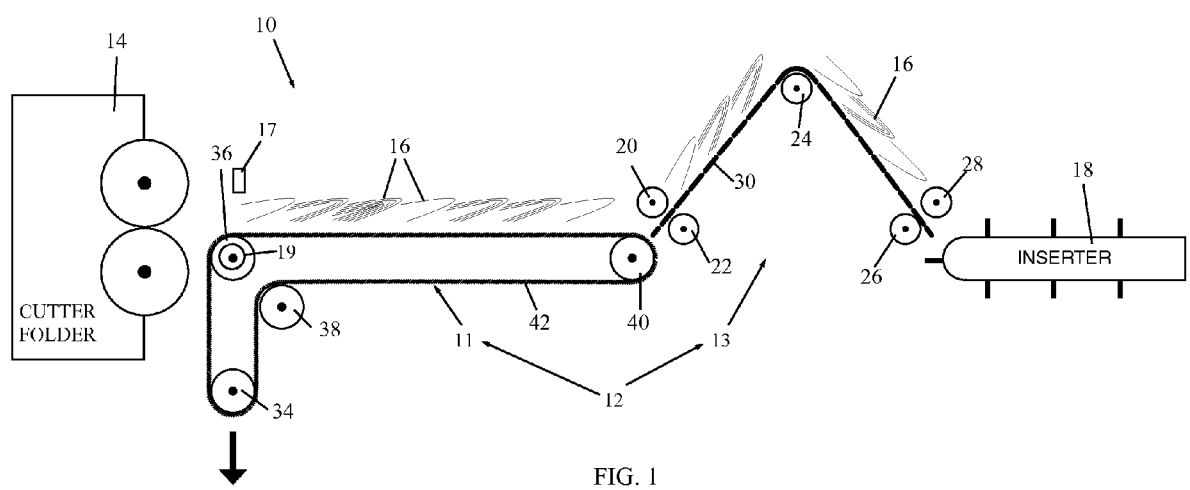
FIGS. 1-3 are simplified illustrations of an inserter system with dynamic buffer, constructed and operative in accordance with an embodiment of the present invention, with the dynamic buffer in three different positions.
Figure 2:
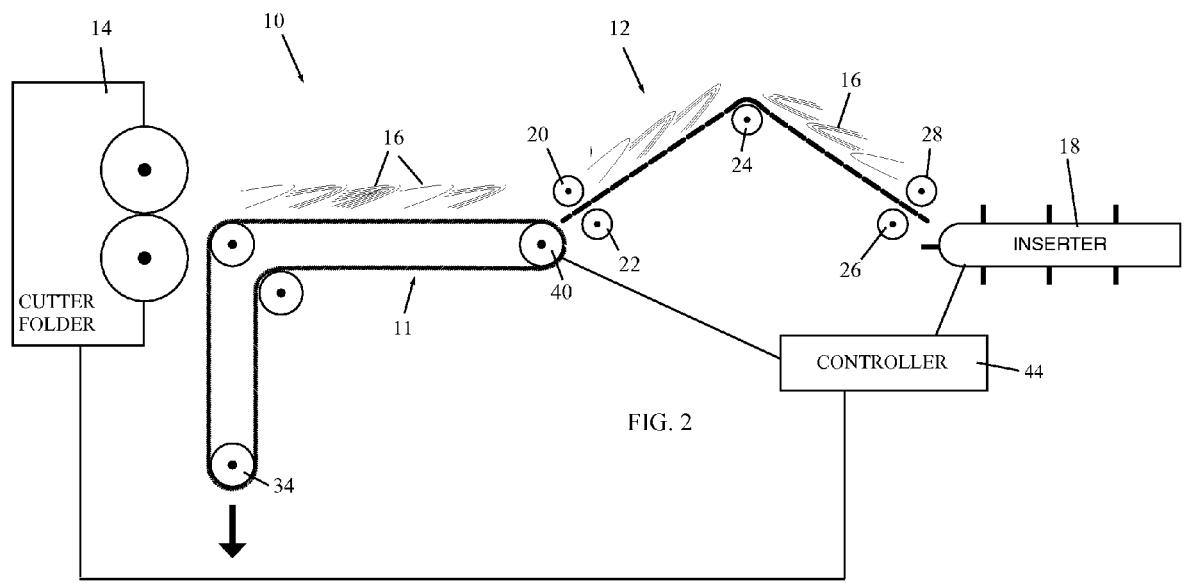
Figure 3:
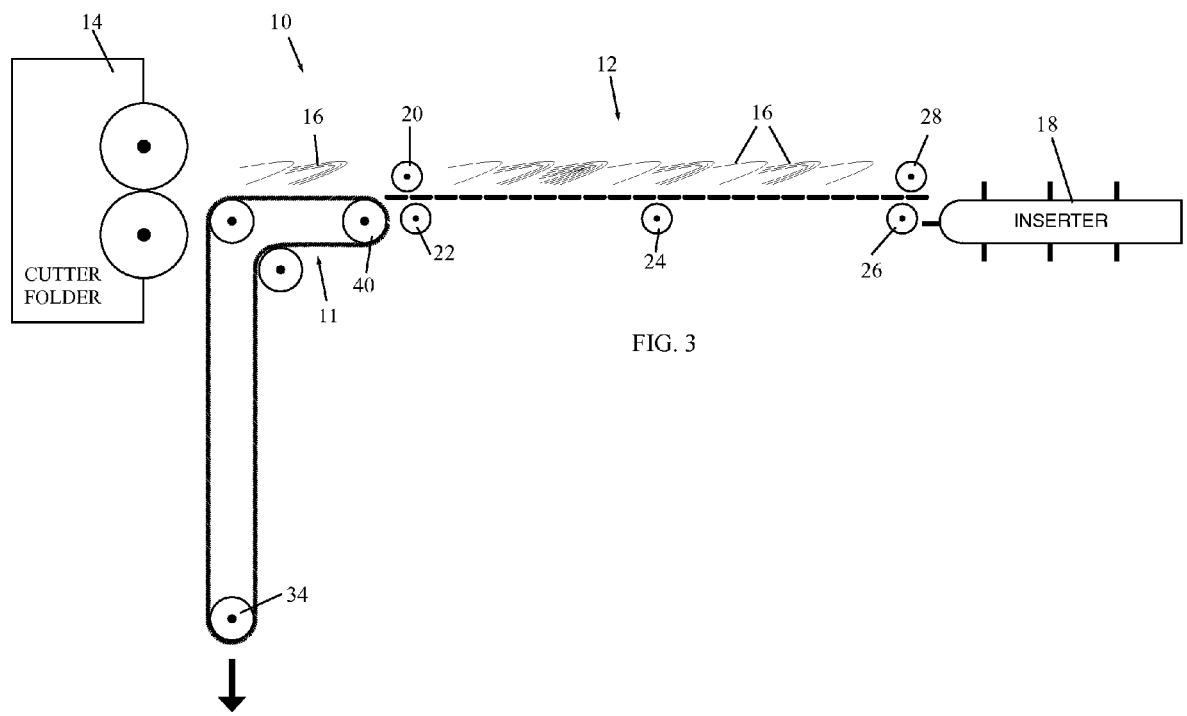

Reference is now made to FIGS. 1-3, which illustrate an inserter system 10 with dynamic buffer 12, constructed and operative in accordance with a non-limiting embodiment of the present invention.

The inserter system 10 includes a first station 14, which may be, without limitation, a cutter (for cutting individual sheets or groups of sheets from a roll of paper) and/or a folder (for folding sheets into folded inserts) or any kind of personal insert provider. The output from first station 14 is a plurality of personal inserts 16 which may have different numbers of pages. The personal inserts 16 are conveyed from first station 14 via the dynamic buffer 12 to an inserter 18 that inserts the personal inserts 16 in envelopes (not shown) or a wrapping system that creates the envelope during the process of inserting. Cutters, folders and inserters are well known in the art and do not require further description.

The following is an example brought to understand the significance of the present invention, but this example does not in anyway limit the scope of the invention.

The cutter cuts or the folder folds, for example, 500 sheets per minute. The personal inserts are fed to the inserter, one per envelope, with a varying number of pages per insert (e.g., 1-10 pages). The number of pages per envelope is random; in one non-limiting example, there are on the average 4 sheets per envelope. In such an example, the cutter or folder must output an average of 125 inserts per minute. However, if there is a consecutive run of personal inserts with 10 pages per insert, the speed would be reduced to 0.4 times 125, that is, 50 inserts per minute. In the prior art, this would force the inserter to be operated at a constant, slow speed of 50 inserts per minute, even though the inserter could be operated at much higher speeds (e.g., 400 inserts per minute). Alternatively, in the prior art, the speed of feeding the inserter would have to be changed many times to accommodate the different personal inserts with different numbers of pages. In any case, in the prior art, the efficiency suffers. In contrast, by using the dynamic buffer 12 of the present invention, the inserter system 10 can operate at close to a constant speed, which improves the efficiency of the system.

In the illustrated embodiment, the dynamic buffer 12 includes an adjustable length conveyor 11 and an inserter-interface conveyor 13.

In the adjustable length conveyor 11, the personal inserts 16 are conveyed without any buffer partitions or pockets (referred to simply as "partitions"; that is, conveyor 11 is partition-less). Instead, the personal inserts 16 lie on the conveyor, preferably (but not necessarily) overlapping each other. The length of adjustable length conveyor 11 can be adjusted in many ways. An exemplary, non-limiting way is shown in the drawings. The conveyor 11 includes a set of conveyor rollers 34, 36, 38 and 40, and a conveyor belt 42 connected to these rollers. Rollers 34 and 40 are movable conveyor rollers movable to various positions. For example, as seen in the sequence of FIGS. 1-3, roller 34 is arranged for translating linearly up and down in the sense of the drawings and roller 40 is arranged for translating linearly left and right in the sense of the drawings. Accordingly, adjustable length conveyor 11 has a changeable length from the first station 14 to the inserter-interface conveyor 13; i.e., it has different lengths at the various positions shown in FIGS. 1-3.

The way in which the personal inserts 16 are placed on conveyor 11 and possibly overlapped may be controlled very simply. For example, an electric eye 17 senses when a personal insert 16 drops onto the conveyor 11 and signals a motor 19 to advance the conveyor belt 42. The advancement can be easily controlled so that the personal inserts 16 overlap each other at any desired degree of overlap.

In accordance with a non-limiting embodiment of the present invention, the inserter-interface conveyor 13 includes a set of conveyor rollers 20/22, 24 ("intermediate roller 24") and 26/28 ("one or more terminal roller(s) 26/28"), and a conveyor belt 30 connected to these rollers. Rollers 20/22 and 24 are movable conveyor rollers that move to different positions. Rollers 20/22 may be "grab" rollers that grab or "pinch" each personal insert 16 fed from conveyor 11.

As roller 40 moves towards first station 14 (to the left in the sense of the drawings), rollers 20/22 also move towards first station 14. This causes intermediate roller 24 to move downwards, thereby changing an angle of the conveyor belt 30 between the intermediate roller 24 and rollers 20/22 or terminal rollers 26/28. The length of the inserter-interface conveyor 13 remains constant (e.g., the distance is constant from movable conveyor rollers 20/22 to terminal rollers 26/28).

In accordance with an embodiment of the present invention, the inserter 18 grabs the personal inserts 16 from inserter-interface conveyor 13 near terminal rollers 26/28. It is the act of the inserter 18 grabbing the personal inserts 16 which determines the speed of conveyor 13, including the timing at which conveyor 13 grabs the personal inserts 16 from conveyor 11. Thus, inserter-interface conveyor 13 feeds the inserter 18 with a timing that is dependent only on the inserter speed; in other words, conveyor 13 and inserter 18 are synchronized with each other.

In accordance with a non-limiting embodiment of the invention a controller 44 controls operation of the dynamic buffer 12 and inserter 18. The length of adjustable length conveyor 11 changes in accordance with the number of personal inserts 16 that are on it. As long as adjustable length conveyor 11 does not go beyond its maximum or minimum length, the system can continue working with inserter 18 working at a constant speed (no matter whether there is the minimum number of inserts on the conveyor 11 or the maximum number or something in between). Thus, up to a certain limit, conveyor 13 of dynamic buffer 12 feeds inserter 18 with a timing that is independent of the speed that first station 14 feeds the personal inserts 16 to conveyor 11.

If the adjustable length conveyor 11 has reached its greatest length, and the controller 44 wishes to ensure that conveyor 11 does not get anymore inserts than it can hold, controller 44 must either speed up inserter 18 or slow down first station 14 so that the system will not put more than the maximum number of inserts on adjustable length conveyor 11. Conversely, if the adjustable length conveyor 11 has reached its smallest length, and the controller 44 wishes to ensure that the conveyor 11 does not become empty, controller 44 must either slow down inserter 18 or speed up first station 14.

Additionally or alternatively, the rollers of the dynamic buffer 12 are maintained at a horizontal plane and controller 44 controls the speed of the conveyor belts 30 and/or 42 and/or controls the speed or timing of the operation of inserter 18.

Thus, in accordance with an embodiment of the present invention, despite the variety of numbers of sheets (and other variables) in the personal inserts 16, the personal inserts 16 may be fed at a constant or almost constant rate to inserter 18 and inserter 18 operates at a constant or almost constant speed.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. An inserter system comprising:
   a first station operative to output personal inserts for inserting in envelopes;
   an inserter operative to insert said personal inserts in said envelopes; and
   a dynamic buffer operative to convey said personal inserts from said first station to said inserter, said dynamic buffer comprising a partition-less adjustable length conveyor and an inserter-interface conveyor,
   wherein said adjustable length conveyor conveys said personal inserts from said first station to said inserter-interface conveyor and said inserter grabs said personal inserts from said inserter-interface conveyor, and wherein said inserter grabbing said personal inserts determines a speed of operation of said inserter-interface conveyor, including a timing at which said inserter-interface conveyor grabs said personal inserts from said adjustable length conveyor and further comprising a controller that controls operation of said dynamic buffer and said inserter.

2. The inserter system according to claim 1, wherein said personal inserts overlap each other on said adjustable length conveyor.

3. The inserter system according to claim 1, wherein said inserter-interface conveyor comprises a set of conveyor rollers that has at least one movable conveyor roller movable to different positions.

4. The inserter system according to claim 3, wherein said inserter-interface conveyor comprises a terminal roller adjacent said inserter and an intermediate roller between said at least one movable conveyor roller and said terminal roller, wherein said intermediate roller is movable such that an angle is changeable between said intermediate roller and said at least one movable conveyor roller or said terminal roller.

5. The inserter system according to claim 4, wherein a distance is constant from said at least one movable conveyor roller to said terminal roller.

6. The inserter system according to claim 1, wherein said adjustable length conveyor comprises at least one movable conveyor roller movable to various positions and said adjustable length conveyor has different lengths at said various positions.

7. The inserter system according to claim 1, wherein a length of said inserter-interface conveyor is constant.

8. The inserter system according to claim 1, wherein a length of said adjustable length conveyor changes in accordance with a number of personal inserts that are on it.

9. The inserter system according to claim 1, wherein said first station comprises a cutter.

10. The inserter system according to claim 1, wherein said first station comprises a folder.

* * * * *